United States Patent
Sathyanarayanamurthy (10) Patent No.: US 12,095,821 B2
(45) Date of Patent: Sep. 17, 2024

(54) ENHANCEMENTS FOR SECURE UPDATING IN COMMUNICATION NETWORKS

(71) Applicant: Nokia Technologies Oy, Espoo (FI)

(72) Inventor: Kiran Sathyanarayanamurthy, Tumakuru (IN)

(73) Assignee: Nokia Technologies Oy, Espoo (FI)

(*) Notice: Subject to any disclaimer, the term of this patent is extended or adjusted under 35 U.S.C. 154(b) by 179 days.

(21) Appl. No.: 17/397,608

(22) Filed: Aug. 9, 2021

(65) Prior Publication Data

US 2022/0053030 A1    Feb. 17, 2022

(30) Foreign Application Priority Data

Aug. 12, 2020  (FI) ...................................... 20205792

(51) Int. Cl.
 *H04L 9/40*      (2022.01)
 *G16Y 10/75*     (2020.01)
 *G16Y 30/10*     (2020.01)

(52) U.S. Cl.
 CPC ............ *H04L 63/205* (2013.01); *G16Y 10/75* (2020.01); *G16Y 30/10* (2020.01); *H04L 63/0209* (2013.01)

(58) Field of Classification Search
 CPC ............... H04L 63/205; H04L 63/0209; H04L 63/0263; H04L 63/1483; H04L 63/0236; H04L 63/02; H04L 63/0227; H04L 63/20; G16Y 10/75; G16Y 30/10
 See application file for complete search history.

(56) References Cited

U.S. PATENT DOCUMENTS

| | | | |
|---|---|---|---|
| 7,171,681 B1 | 1/2007 | Duncan et al. | |
| 2005/0083935 A1 | 4/2005 | Kounavis et al. | |
| 2007/0199062 A1* | 8/2007 | Cho ........................ | H04L 63/08 726/12 |

(Continued)

FOREIGN PATENT DOCUMENTS

| CN | 101984623 A | 3/2011 |
|---|---|---|
| CN | 109660548 A | 4/2019 |
| WO | 2019/239191 A1 | 12/2019 |

OTHER PUBLICATIONS

Extended European Search Report received for corresponding European Patent Application No. 21190014.7, dated Nov. 12, 2021, 10 pages.

(Continued)

*Primary Examiner* — Amie C. Lin
(74) *Attorney, Agent, or Firm* — Nokia Technologies Oy (57) ABSTRACT

According to an example aspect of the present invention, there is provided a method comprising transmitting to a security service provider, by a firewall apparatus, a request to update firewall strategy of the firewall apparatus for a location center, wherein the request comprises at least one characteristic of the firewall apparatus, the at least one characteristic of the firewall apparatus further comprising load data of the firewall apparatus, receiving from the security service provider, by the firewall apparatus, an updated firewall strategy for the location center, wherein the updated firewall strategy comprises load data required by the updated firewall strategy and adjusting the operation of the firewall apparatus based on the updated firewall strategy by reserving resources at the firewall apparatus for updates according to the required load data.

17 Claims, 8 Drawing Sheets

(56) References Cited

U.S. PATENT DOCUMENTS

| | | | |
|---|---|---|---|
| 2011/0013634 A1* | 1/2011 | Swander | H04L 63/164 |
| | | | 726/14 |
| 2011/0225574 A1 | 9/2011 | Khalidi et al. | |
| 2016/0105311 A1* | 4/2016 | Thakkar | G06F 9/45558 |
| | | | 709/222 |
| 2016/0170841 A1 | 6/2016 | Yarnell et al. | |
| 2018/0115580 A1 | 4/2018 | Nenov | |
| 2019/0215755 A1 | 7/2019 | Faynberg et al. | |
| 2019/0334869 A1* | 10/2019 | Grant | H04L 61/5007 |
| 2019/0373472 A1* | 12/2019 | Smith | H04W 12/108 |
| 2022/0066622 A1* | 3/2022 | Takano | G16Y 30/00 |
| 2022/0417086 A1* | 12/2022 | Klitte | H04L 41/0803 |

OTHER PUBLICATIONS

"3rd Generation Partnership Project; Technical Specification Group Services and System Aspects; Architecture enhancements to facilitate communications with packet data networks and applications (Release 16)", 3GPP TS 23.682, V16.5.0, Dec. 2019, pp. 1-134.

"3rd Generation Partnership Project; Technical Specification Group Core Network and Terminals; IP Multimedia (IM) Subsystem Sh interface; Signalling flows and message contents (Release 15)", 3GPP TS 29.328, V15.8.0, Dec. 2019, pp. 1-79.

"Maintaining the Focus on IoT Cybersecurity in 2018", IoT Agenda, Retrieved on Aug. 5, 2021, Webpage available at : https://internetofthingsagenda.techtarget.com/blog/IoT-Agenda/Maintaining-the-focus-on-IoT-cybersecurity-in-2018.

Office action received for corresponding Finnish Patent Application No. 20205792, dated Feb. 22, 2021, 8 pages.

Reddy K et al., "Distributed Denial-of-Service Open Threat Signaling (DOTS) Signal Channel Specification", RFC 8782, Engineering Task Force (IETF), May 2020, pp. 1-100.

"Generic Protection Profile",Eurosmart, Technical Report [TR-e-IoT-Part-2], Pilot—v1.2 Release, 2019, pp. 1-123.

Zandberg et al., "Secure Firmware Updates for Constrained IoT Devices Using Open Standards: A Reality Check", IEEE Access, vol. 7, May 29, 2019, pp. 71907-71920.

Office action received for corresponding Finnish Patent Application No. 20205792, dated Jul. 23, 2021, 8 pages.

He et al., "Mechanism's Design of Firewall's Load Balancing", Application Research of Computers, vol. 2005, No. 10, 2005, 6 pages.

Office action received for corresponding Chinese Patent Application No. 202110918152.X, dated Jul. 7, 2024, 5 pages of office action and 3 pages of office action translation available.

\* cited by examiner

ENHANCEMENTS FOR SECURE UPDATING IN COMMUNICATION NETWORKS

FIELD

Various example embodiments relate in general to communication networks, such as core networks of cellular communication systems, and more specifically, to enhancing secure updating in such networks.

BACKGROUND

Regular updating of communication devices is required in various communication networks. However, security of updating procedures needs to be ensured to avoid losses and damages due to attacks. For instance, Internet of Things, IoT, devices, such as smart meters, may need to be updated more frequently than some other computers but at the same security should be ensured. Security is particularly important for mission critical IoT devices which provide critical services because if such devices are attacked, significant losses and damages may occur. Proper security patching under constrained resource environment demands highly efficient attack prevention strategy that can reduce/prevent the damages in insecure IoT network of devices. There is therefore a need to provide improved methods, apparatuses and computer programs for enhancing secure updating in communication networks.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided a method comprising transmitting to a security service provider, by a firewall apparatus, a request to update firewall strategy of the firewall apparatus for a location center, wherein the request comprises at least one characteristic of the firewall apparatus, the at least one characteristic of the firewall apparatus further comprising load data of the firewall apparatus, receiving from the security service provider, by the firewall apparatus, an updated firewall strategy for the location center, wherein the updated firewall strategy comprises load data required by the updated firewall strategy and adjusting the operation of the firewall apparatus based on the updated firewall strategy by reserving resources at the firewall apparatus for updates according to the required load data.

Example embodiments of the first aspect may comprise at least one feature from the following bulleted list or any combination of the following features:

- receiving an update concerning at least one Internet of Things, IoT, device, determining whether the update is from the location center based on the updated firewall strategy and deciding whether to forward the update to the at least one IoT device depending on said determination;
- forwarding the update to the at least one IoT device upon determining that the update is from the location center;
- dropping the update concerning the at least one IoT device upon determining that the update is not from the location center;
- the at least one characteristic of the firewall apparatus comprises an indication about at least one of a number of processes running at the firewall apparatus, number of threads in a process running at the firewall apparatus, mode of device operations of the firewall apparatus, at least one transport protocol supported by the firewall apparatus, at least one application layer protocol supported by the firewall apparatus, at least one Internet Protocol, IP, version supported by the firewall apparatus, response timers of the firewall apparatus, a number of connections at the firewall apparatus and a mode of connection of the firewall apparatus;
- wherein the updated firewall strategy comprises a time interval;
- determining that an update concerning at least one IoT device is valid when the update is received during the time interval;
- the updated firewall strategy comprises an indication about an input port of the firewall apparatus;
- determining that an update concerning at least one IoT device is valid when the update is received at the input port;
- the updated firewall strategy comprises an indication about a source port of the location center;
- determining that the update is valid when the update is received from the source port.

According to a second aspect of the present invention, there is provided a method comprising receiving from a firewall apparatus, by a security service provider, a request to update a firewall strategy for the firewall apparatus and a location center, wherein the request comprises at least one characteristic of the firewall apparatus, the at least one characteristic of the firewall apparatus further comprising load data of the firewall apparatus, updating, by the security service provider, the firewall strategy of the firewall apparatus for the location center based on the at least one characteristic of the firewall apparatus and transmitting, by the security service provider, the updated firewall strategy to the firewall apparatus, wherein the updated firewall strategy comprises load data required by the updated firewall strategy.

Example embodiments of the second aspect may comprise at least one feature from the following bulleted list or any combination of the following features:

- the at least one characteristic of the firewall apparatus comprises an indication about at least one of a number of processes running at the firewall apparatus, number of threads in a process running at the firewall apparatus, mode of device operations of the firewall apparatus, at least one transport protocol supported by the firewall apparatus, at least one application layer protocol supported by the firewall apparatus, at least one Internet Protocol, IP, version supported by the firewall apparatus, a response timer of the firewall apparatus, a number of connections at the firewall apparatus and a mode of connection of the firewall apparatus;
- the updated firewall strategy comprises a time interval;
- the updated firewall strategy comprises an indication about an input port of the firewall apparatus;
- the updated firewall strategy comprises an indication about an input port of the firewall apparatus;
- the updated firewall strategy comprises an indication about a source port of the location center;

transmitting the updated firewall strategy to the location center.

According to a third aspect of the present invention, there is provided an apparatus, comprising one or more processors, and memory storing instructions that, when executed by the one or more processors, cause the apparatus to perform the first method. The at least one memory and the computer program code may be configured to, with the at least one processing core, cause the apparatus at least to perform, transmit to a security service provider, by a firewall apparatus, a request to update firewall strategy of the firewall apparatus for a location center, wherein the request comprises at least one characteristic of the firewall apparatus, the at least one characteristic of the firewall apparatus further comprising load data of the firewall apparatus, receive from the security service provider, by the firewall apparatus, an updated firewall strategy for the location center, wherein the updated firewall strategy comprises load data required by the updated firewall strategy and adjust the operation of the firewall apparatus based on the updated firewall strategy by reserving resources at the firewall apparatus for updates according to the required load data.

According to a fourth aspect of the present invention, there is provided an apparatus, comprising one or more processors, and memory storing instructions that, when executed by the one or more processors, cause the apparatus to perform the second method. The at least one memory and the computer program code may be further configured to, with the at least one processing core, cause the apparatus at least to perform, receive from a firewall apparatus, by a security service provider, a request to update a firewall strategy for the firewall apparatus and a location center, wherein the request comprises at least one characteristic of the firewall apparatus, the at least one characteristic of the firewall apparatus further comprising load data of the firewall apparatus, update, by the security service provider, the firewall strategy of the firewall apparatus for the location center based on the at least one characteristic of the firewall apparatus and transmit, by the security service provider, the updated firewall strategy to the firewall apparatus, wherein the updated firewall strategy comprises load data required by the updated firewall strategy.

According to a fifth aspect of the present invention, there is provided an apparatus, comprising means for performing the first method. The apparatus may comprise means for transmitting to a security service provider, by a firewall apparatus, a request to update firewall strategy of the firewall apparatus for a location center, wherein the request comprises at least one characteristic of the firewall apparatus, the at least one characteristic of the firewall apparatus further comprising load data of the firewall apparatus, means for receiving from the security service provider, by the firewall apparatus, an updated firewall strategy for the location center, wherein the updated firewall strategy comprises load data required by the updated firewall strategy and means for adjusting the operation of the firewall apparatus based on the updated firewall strategy by reserving resources at the firewall apparatus for updates according to the required load data.

According to a sixth aspect of the present invention, there is provided an apparatus, comprising means for performing the second method. The apparatus may comprise means for receiving from a firewall apparatus, by a security service provider, a request to update a firewall strategy for the firewall apparatus and a location center, wherein the request comprises at least one characteristic of the firewall apparatus, the at least one characteristic of the firewall apparatus further comprising load data of the firewall apparatus, means for updating, by the security service provider, the firewall strategy of the firewall apparatus for the location center based on the at least one characteristic of the firewall apparatus and means for transmitting, by the security service provider, the updated firewall strategy to the firewall apparatus, wherein the updated firewall strategy comprises load data required by the updated firewall strategy.

According to a seventh aspect of the present invention, there is provided non-transitory computer readable medium having stored thereon a set of computer readable instructions that, when executed by at least one processor, cause an apparatus to at least perform the method of the first aspect. According to an eighth aspect of the present invention, there is provided non-transitory computer readable medium having stored thereon a set of computer readable instructions that, when executed by at least one processor, cause an apparatus to at least perform the method of the second aspect.

According to a ninth aspect of the present invention, there is provided a computer program configured to perform the method of the first aspect. According to a tenth aspect of the present invention, there is provided a computer program configured to perform the method of the second aspect.

EXAMPLE EMBODIMENTS

Secure updating in communication networks may be enhanced by the procedures described herein for example for wireless devices, such as Internet of Things, IoT, devices. Secure updating may be provided by exploiting at least load data of a firewall apparatus at a security service provider for updating a firewall strategy of the firewall apparatus, to generate an updated firewall strategy which can be executed by the firewall apparatus. The updated firewall strategy may comprise information about load data required by the firewall strategy and hence it can be ensured that the firewall apparatus reserves enough resources for handling the update, thereby avoiding unnecessary transmissions by resource limited devices, such as IoT devices.

Figure 1:
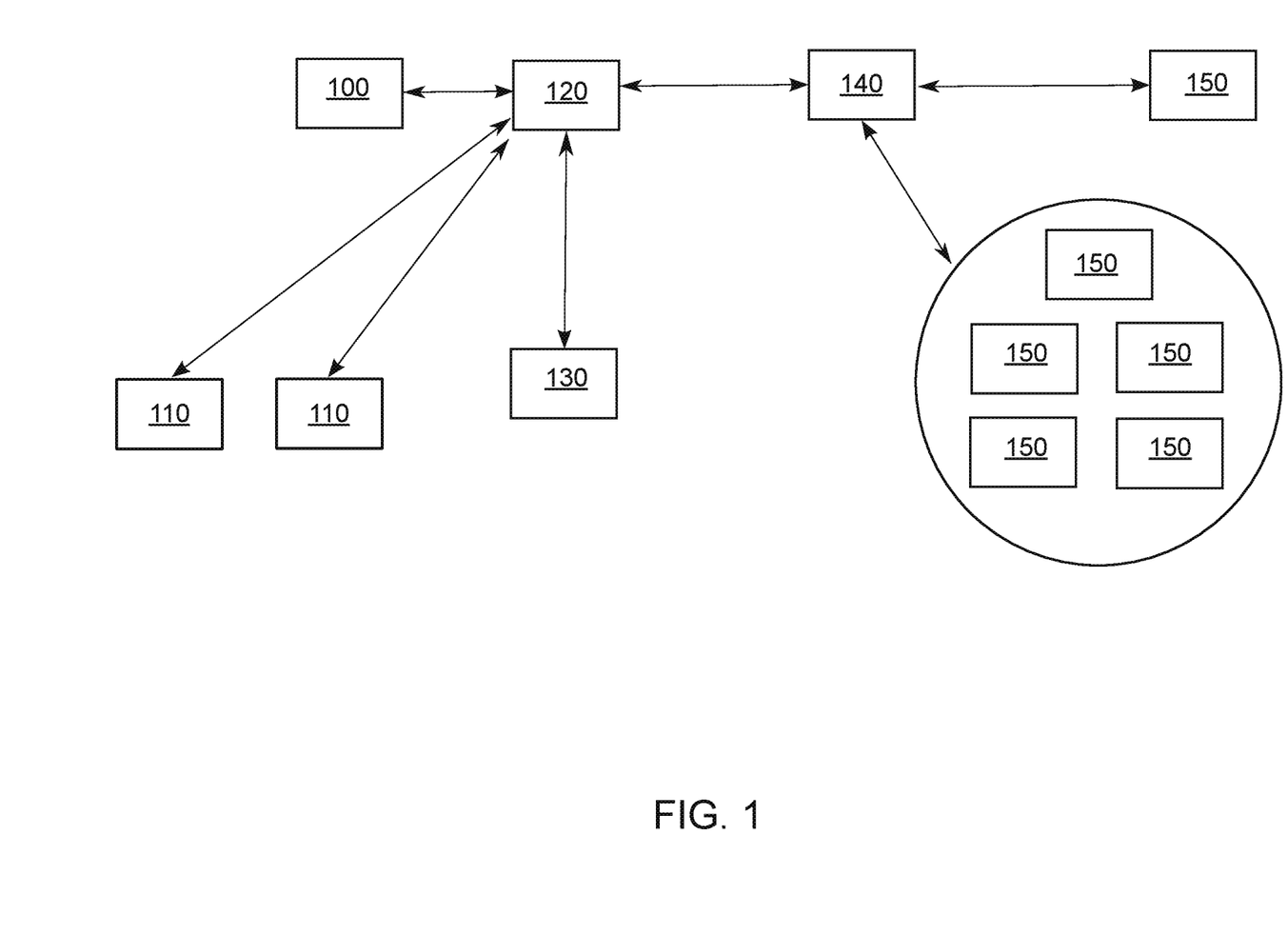
FIG. 1 illustrates an exemplary system in accordance with at least some example embodiments.

FIG. 1 illustrates an exemplary system in accordance with at least some example embodiments of the present invention. The exemplary system of FIG. 1 comprises mobile network 100, at least one location center 110 and Radio Access Network, RAN, 120. Mobile network 100 may further comprise another RAN and a core network. At least one location center 110 may also be referred to as an authenticated location center, such as a location center of a cellular communication system. The exemplary system of FIG. 1 also comprises malicious apparatus 130, such as a BotNet attack/intrusive element, and firewall apparatus 140. Firewall apparatus 140 may comprise means for performing actions of a firewall. For instance, firewall apparatus 140 may be configured to perform such actions. For instance, firewall apparatus 140 may be referred to an apparatus which provides a Strategy Oriented Firewall Service, SOFS.

The exemplary system of FIG. 1 comprises at least one wireless device 150 as well. At least one wireless device 150 may comprise, for example, a smartphone, a cellular phone, a Machine-to-Machine, M2M, node, Machine-Type Communications, MTC, node, an IoT node, a car telemetry unit, a laptop computer, a tablet computer or, indeed, another kind of suitable wireless terminal. In some embodiments, at least one wireless device 150 may refer to a single IoT device. Alternatively, at least one wireless device 150 may refer to a group of IoT devices, which form for example a group as defined by the 3rd Generation Partnership Project, 3GPP. In such a case, devices of the group may have the same external group identity, as defined in the 3GPP standard specification TS 23.682 for example. Embodiments of the present invention may be particularly useful in case of IoT devices, because IoT devices may be spoofed from monitoring and typically the number of IoT devices is high.

In the example system of FIG. 1, at least one wireless device 150 may communicate wirelessly with a cell of RAN 120. Air interface between RAN 120 and at least one wireless device 150 may be configured in accordance with a Radio Access Technology, RAT, which both RAN 120 and at least one wireless device 150 are configured to support. Examples of cellular RATs include Long Term Evolution, LTE, New Radio, NR, which may also be known as fifth generation, 5G, radio access technology and MulteFire. For example, in the context of LTE, BS 120 may be referred to as eNB while in the context of NR, BS 120 may be referred to as gNB. In any case, embodiments of the present invention are not restricted to any particular wireless technology. Instead, embodiments may be exploited in any communication system, wherein secure updating of wireless devices is desirable. In accordance with embodiments of the present invention, updating covers upgrading as well.

The SOFS may be embedded into Network Functions, NFs, or deployed as a separate element which may be a front end for at least one nominated wireless device 150, such as an IoT device, a group of IoT devices or IoT device farms/clusters. In case of the 3GPP, Service-Based Architecture, SBA, of 5G core networks, NFs may comprise at least some of an Access and Mobility Function, AMF, a Session Management Function, SMF, a Network Slice Selection Function, NSSF, a Network Exposure Function, NEF, an NRF, an Unified Data Management, UDM, an User Data Repository, UDR, an Unstructured Data Storage Function, UDSF, an Authentication Server Function, AUSF, a Policy Control Function, PCF, an Application Function, AF, Operations Administration and Maintenance, OAM, and Network Data Analysis Function, NWDAF.

In some embodiments, the SOFS may be authenticated with a mobile network or a satellite network. The SOFS may get an initial seed during authentication and/or registration procedures. The initial seed may be access network related data of upgrade/update end points to which the SOFS may further connect or accept connection based on various strategies and protocols. The SOFS may be running in a cloud infra of an operator or within a device as embedded hardware and/or software. At least one wireless device 150 may instruct a network to pass all updates/upgrades via the SOFS.

With reference to FIG. 1 again, malicious apparatus may 130 try to update at least one wireless device 150, e.g., by performing a BotNet attack. However, firewall apparatus 140, i.e., the SOFS, may be located in-between malicious apparatus 130 and at least one wireless device 150. Thus, firewall apparatus 140 may detect the attack and drop the update by executing an access control strategy. Execution of the access control strategy may comprise for example raising an alarm to a user/network, dynamic blacklisting and learning the behavior of Botnet attacks via anonymous device simulation etc. On the other hand, firewall apparatus 140 may forward the update to at least one wireless device 150, if the update is determined as valid, i.e., legitimate, by firewall apparatus 140.

Efficient security operations are important especially for IoT devices. Regular software/security updates may be required but as IoT devices have limited resources, such procedures should not waste resources. For example in case of mission critical IoT devices attacks may lead to remarkable losses and damages. Highly efficient security procedures for preventing attacks are therefore needed to prevent, or at least mitigate, damages. Hence, embodiments of the present invention in general provide protection for IoT device(s), e.g., against Botnet and ransomware attacks. Some embodiments provide protection especially for mission critical IoT devices.

Figure 2:
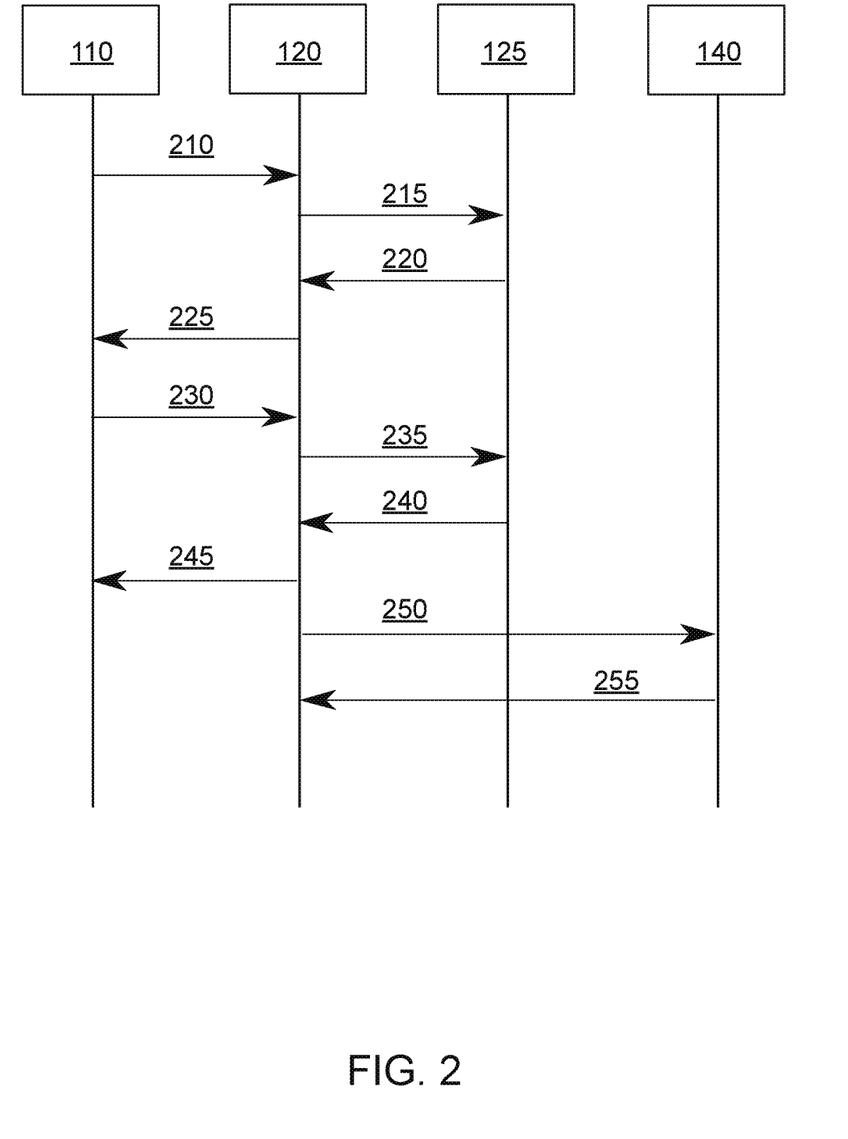
FIG. 2 illustrates a first signalling graph in accordance with at least some example embodiments.

FIG. 2 illustrates a first signalling example in accordance with at least some example embodiments. With reference to FIG. 1, on the vertical axes are disposed, from the left to the right, location center 110, RAN 120, core network function 125 (not shown in FIG. 1) and firewall apparatus 140, i.e., the SOFS. RAN 120 may be referred to as an access network function as well. RAN 120 may be a Mobility Management Entity, MME, or an AMF while core network function 125 may be a Home Subsriber Server, HSS, or UDM. Time advances from the top towards the bottom.

In some embodiments, location center 110 which forwards the trusted updates may be authenticated, authorized and registered, e.g., using 3GPP mechanisms. Moreover, location center 110 may also send location information statically or dynamically in a registration response to RAN 120. For instance, representation of the SOFS data, comprising the location information for example, may be realized by reusing the 3GPP defined optional vendor specific AVP or represented as repository data with special service indication by using a 3GPP application server.

At step 210, location center 110 may send an authentication request to RAN 102. The authentication request may comprise an identity of location center 110, to be used for identifying that the authentication request is for authenticating location center 110. At step 215, RAN 120 may forward the authentication request to core network function 125. Core network function 125 may authenticate location center 125 upon receiving the authentication request and generate authentication vectors. At step 220, core network function may transmit an authentication response to RAN 120, the authentication response comprising the authentication vectors generated for location center 110. At step 225, RAN 120 may verify location center 110 via mutual authentication, using 3GPP methods of authentication for example, and transmit the authentication response to location center 110, to indicate that authentication was successful. In some embodiments, location center 110 may be analogous to a user equipment.

At step 230, after successful authentication, location center 110 may transmit a registration request to RAN 120. At step 235, RAN 120 may transmit the registration request to core network function 125. Core network function 125 may, upon receiving the registration request and having already authorized firewall apparatus 140, i.e., the SOFS, perform registration of location center 110. Then, at step 240, core network function 125 may transmit a registration response comprising SOFS data, such as location data, any data related to events in RAN 120 and/or any parameters of RAN 120, and an address of firewall apparatus 140 to RAN 120. The SOFS data may comprise the initial seed for example. Upon receiving the SOFS data and the address of firewall apparatus 140, RAN 120 may, at step 245, transmit the registration response to location center 110, to indicate that the registration was successful.

At step 250, RAN 120 may transmit a notification to firewall apparatus 140. The notification may be transmitted to the address of firewall apparatus 140. In some embodiments, the notification may be an implicit notification. The notification may comprise the SOFS data and an identifier of location center 110. That is to say, RAN 120 may get the address of firewall apparatus 140, which was authorized by core network function 125, and feed parameters related to location center 110 to firewall apparatus 140. Firewall apparatus 140 may store the received parameters related to location center 110 for applying a firewall strategy concerning updates associated with location center 110.

Figure 3:
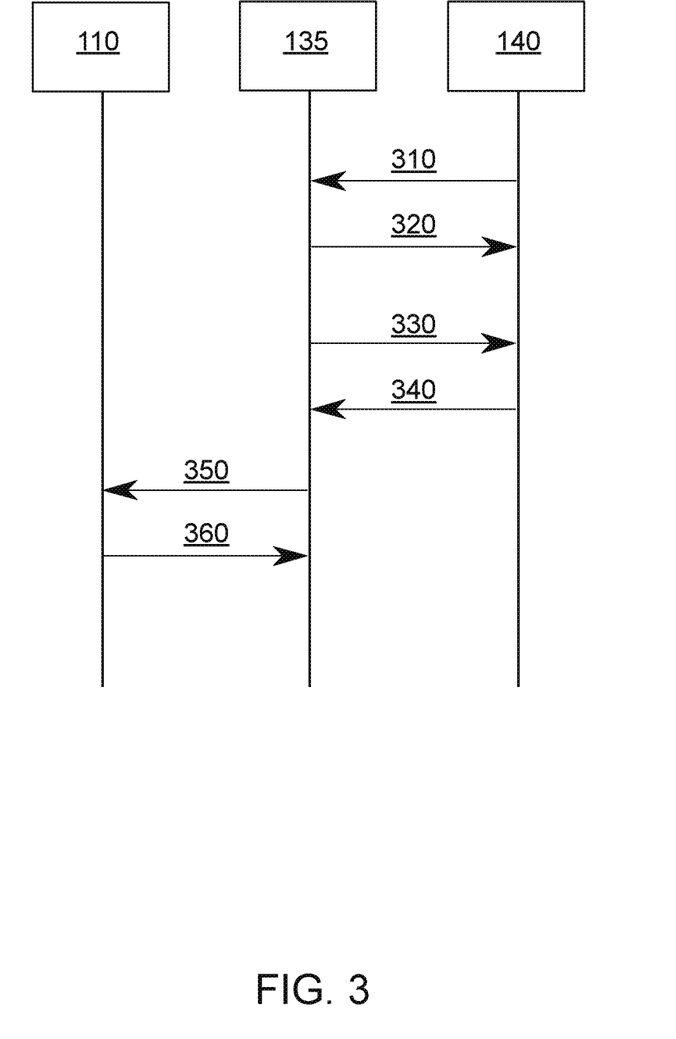
FIG. 3 illustrates a second signalling graph in accordance with at least some example embodiments.

FIG. 3 illustrates a second signalling example in accordance with at least some example embodiments. With reference to FIG. 1, on the vertical axes are disposed, from the left to the right, location center 110, Security Service Provider, SSP, 135 (not shown in FIG. 1) and apparatus 140, i.e., the SOFS. Time advances from the top towards the bottom.

SSP 135 may determine and transmit firewall strategies to be executed by firewall apparatus 140, i.e., the SOFS. SSP 135 may be in a trusted domain of an operator for example. SSP 135 may construct the firewall strategies for firewall apparatus 140. For instance, SSP 135 may have a rule based machine learning method for constructing data and rule sets for the firewall strategies based on network parameters related to location center 110 and/or device characteristics of firewall apparatus 140.

At step 310, firewall apparatus 140 may transmit a Device Characteristics Request, DCR, to SSP 135, the DCR comprising at least one characteristic of firewall apparatus 140. In some embodiments, the DCR may be referred to as a request to update firewall strategy of firewall apparatus 140 for location center 110 as well. At step 320, SSP 135 may acknowledge the DCR by transmitting a Device Characteristics Acknowledgement, DCA, to firewall apparatus 140. That is to say, the DCR/DCA command pairs may be used to propagate the device characteristics from the SOFS to SSP 135.

The DCR may comprise at least one of the following device characteristics of firewall apparatus 140, for example depending on performance, robustness, security and quality:

Load Data (Central Processing Unit, CPU, Memory and/or Disk) of firewall apparatus 140. The load data is particularly important in case of IoT devices, as it ensures that firewall apparatus 140 can reserve enough resources for handling the update, thereby avoiding unnecessary transmissions by resource limited IoT devices. In some embodiments, less resources and a single stream instead of a multi stream may be required for small updates. In general, load data of firewall apparatus 140 may refer to resources of firewall apparatus 140, such as computing resources, memory resources and/or disk space;

Number of processes running at firewall apparatus 140. Similarly as above, such information may be used to make it possible to reserve enough resources at firewall apparatus 140;

Number of threads in a specific critical process, i.e., in the selected process running at apparatus 140;

Mode of device operations (Virtualized, non-virtualized, containerized, uni-kernel mode) of firewall apparatus 140;

Transport protocols supported by firewall apparatus 140;

Application layer protocols supported by firewall apparatus 140;

IP versions (V4 or V6) supported by firewall apparatus 140;

Response timers, i.e., time intervals when the updates concerning at least one wireless device may be received and validity checked. Such information is particularly important for mission critical IoT devices, because it provides both, enhanced security (the time interval has to be known to get the update through) and avoids unnecessary transmissions by resource limited mission critical IoT devices (updates only possible during response times);

Number of connections of firewall apparatus 140;

Mode of connections (Client, Server, Relay, Redirect, Proxy, Agent, . . . ) of firewall apparatus 140.

At step 330, firewall apparatus 140 may receive a Strategy Update Request, SUR, from SSP 135, the SUR comprising an updated firewall strategy for location center 110. The SUR may refer to the notification transmitted at step 250 of FIG. 2. In general, the SUR may comprise rule sets usable for validating the trusted location center, i.e., location center 110. In some embodiments, the updated firewall strategy may comprise load data required by the update firewall strategy of firewall apparatus 140 for location center 110 as well. At step 340, firewall apparatus may acknowledge the SUR by transmitting a Strategy Update Acknowledgement, SUA, to SSP 135. That is to say, the SUR/SUA command pairs may be used to propagate the device characteristics from SSP 135 to the SOFS.

The updated firewall strategy may comprise rule sets (e.g., knowledge based) for making a prediction model at firewall apparatus, i.e., the SOFS. For instance, the updated firewall strategy may comprise one or more of the following:

mapping of an identifier of location center 110, such as Location Centre Cell-ID, to specific device characteristics of firewall apparatus 140, such as an input port of firewall apparatus 140 on which software/hardware updates and/or upgrades arrive;

mapping of the identifier of location center 110 to a specific scheduled time, or time interval, when location center 110 is allowed to transmit updates/upgrades;

mapping of a source port of location center 110 and a input port of firewall apparatus 140;

an identity of an algorithm, which may be shared between SSP 135 and firewall apparatus 140;

certain events from application servers to facilitate a condition to build the rule sets. For instance, specific repository data that has certain supplementary services may be created, to help to build the rule set. Subscription to PDN or registration status changes of location center 110 may be enabled as well. Also other events may be considered, such as monitoring events, communication events, etc.;

mobility factor to location center 110 via applications on location center 110. In some embodiments, apart from an existing static location, location center 110 may be shifted to a new zone stochastically using cloud computing features like migration, to induce mobility or add extra metadata to location data of location center 110;

mapping an internal status of location center 110.

For instance, SSP 135 may formulate at least one of the following rules and add corresponding indication(s) to the updated firewall strategy:

Rule 1: "Location Centre LC1 cell-ID=CI-1". That is to say, SSP 135 may include an indication about the identity of location center 110 to the updated firewall strategy.

Rule 2: "SOFS Load-Data={load-level=5}". That is to say, SSP 135 may include an indication about the load level required by the updated firewall strategy. Firewall apparatus 140 may adjust its operation by reserving resources, such as CPU, memory and disk resources, at firewall apparatus 140 according to the required load. Hence it may be ensured that firewall apparatus 140 reserves enough resources for handling the update, thereby avoiding unnecessary transmissions by resource limited IoT devices. SSP 135 may check that the load data required by the updated firewall strategy does not exceed the load data of firewall apparatus 140, indicated by firewall apparatus 140 in the DCR. In general, load data required by the updated firewall strategy may refer to required resources, such as computing resources, memory resources and/or disk space;

Rule 3: "Source-Port of SOFS=HASH(CI-1)". That is to say, SSP 135 may include an indication about the source port of location center 110 to the updated firewall strategy, thereby providing enhanced security.

Rule 3: "Transport-Protocol=SCTP". That is to say, SSP 135 may include an indication about the transport protocol to be used to the updated firewall strategy.

Rule 4: "Multihoming and streaming enabled". That is to say, SSP 135 may include an indication about whether multihoming and streaming are enabled to the updated firewall strategy.

Rule 5: "IP used=IPV6". That is to say, SSP 135 may include an indication about the IP version to be used to the updated firewall strategy.

Rule 6: "Schedule at T1". That is to say, SSP 135 may include an indication about the time interval when an update can be considered as valid to the updated firewall strategy. This is particularly important for mission critical IoT devices, because security is enhanced (the time interval has to be known to get the update through) while unnecessary transmissions by resource limited mission critical IoT devices are avoided (updates only possible during response times). SSP 135 may check that the time interval required by the updated firewall strategy is within the response timers of firewall apparatus 140, indicated by firewall apparatus 140 in the DCR;

Rule 7: "Algorithm-Id=Id2". In some embodiments, the destination port, i.e., the input port of firewall apparatus 140 may be indicated by an algorithm. For example, considering the Algorithm-Id=Id2 may map to an algorithm with mathematical model M. The destination port may then be Dp=M(R1 . . . Rn-1). In general, any indication about the input port of firewall apparatus 140 may be used though.

At step 350, location center 110 may receive an Update Schedule Request, USR, from SSP 135, the USR comprising an updated schedule for location center 110. At step 360, location center 110 may acknowledge the USR by transmitting an Update Schedule Acknowledgement, USA, to SSP 135. That is to say, the USR/USA command pairs may be used to update schedules for software updates/upgrades, from SSP 135 to SOFS location center 110.

Location information may comprise for example a location number, service area identity, cell global identity, location area identity, geographical information, geodetic information, serving node details, tracking area identity, visited PLMN identity, RAT type, age of location information etc. as defined for example in the 3GPP standard specification TS 29.328, section 7.6.6.

In some embodiments, firewall apparatus, i.e., the SOFS, may acknowledge SSP 135 on the rule set using a unique reference identity that maps to an encoding scheme used to represent rule. SSP 135 may trigger location center 110 to schedule the software/hardware updates and/or upgrades with the exact rule agreed with the SOFS.

Figure 4:
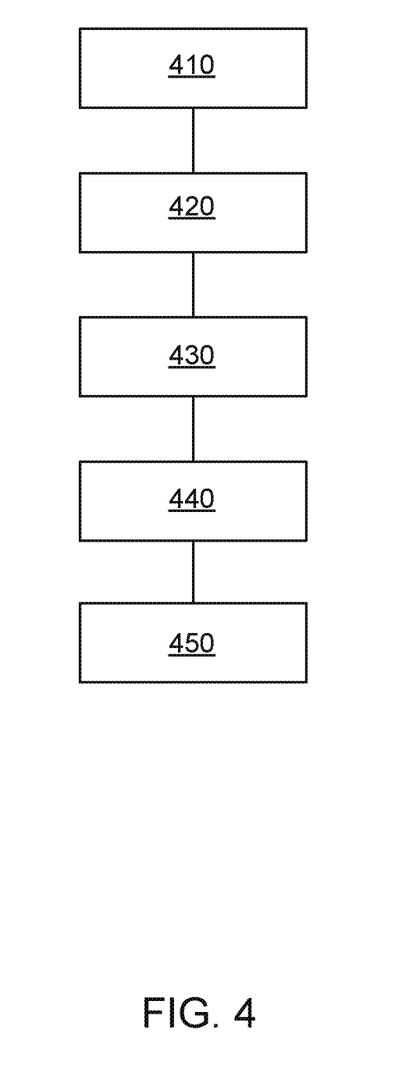
FIG. 4 illustrates a first workflow in accordance with at least some example embodiments.

FIG. 4 illustrates a first workflow in accordance with at least some example embodiments. The first workflow demonstrates an exemplary workflow of firewall apparatus 140. At step 410, handling of the SUR may start at firewall apparatus 140. Firewall apparatus 140 may receive the SUR comprising an updated firewall strategy, the SUR comprising at least one characteristic of firewall apparatus 140 and the at least one characteristic of firewall apparatus 140 further comprising at least load data of firewall apparatus 140.

In some embodiments, the updated firewall strategy may also comprise a time interval when location center 110 is allowed to transmit an update concerning at least one wireless device 150. Alternatively, or in addition, the updated firewall strategy may comprise an indication about an input port of firewall apparatus 140, i.e., destination port of the update concerning at least one wireless device 150. In some embodiments, the updated firewall strategy may comprise an indication about a source port of location center 110.

At step 420, firewall apparatus 140 may adjust operation of firewall apparatus 140 according to the updated firewall strategy, e.g., by configuring a receiver of firewall apparatus 140 according to the updated firewall strategy. For instance, operation of firewall apparatus 140 may be adjusted according to load data required by the updated firewall strategy. For instance, the load data may require 3v CPU, 8 GB RAM and 1 GB disk. In such a case, SSP 135 may check before updating the firewall strategy that the load data required by the updated firewall strategy is less than the load data of firewall apparatus 140, to ensure that firewall apparatus 140 can execute the updated firewall strategy. Firewall apparatus 140 may hence reserve resources at firewall apparatus 140 for updates according to the required load data. In addition, operation of firewall apparatus 140 may be adjusted according to the time interval so that a receiver of firewall apparatus 140 is ready for reception, e.g., about 1 second before the time interval starts.

At step 430, firewall apparatus 140 may adjust its operation by opening a SCTP transport connection with the indicated source port of location center 110, e.g., with an indicated IPV6 address, and make the receiver ready for reception. The input port of firewall apparatus 140 may be prepared similarly at step 440 and the processing of the SUR may be done at step 450.

Figure 5:
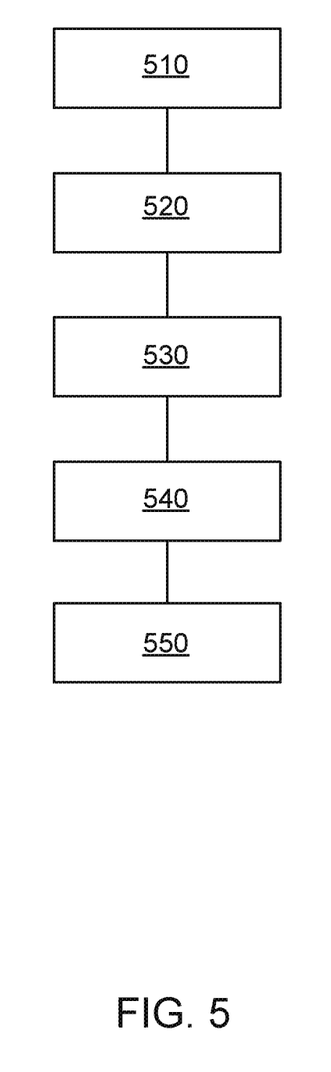
FIG. 5 illustrates a second workflow in accordance with at least some example embodiments.

FIG. 5 illustrates a second workflow in accordance with at least some example embodiments. The second workflow demonstrates an exemplary workflow of location center 110. At step 510, handling of the USR may start at location center 110. At step 520, location center 110 may adjust its operation according to the updated firewall strategy, e.g., by configuring a transmitter of location center 110 according to the updated firewall strategy. Location center 110 may adjust its operation for example by extracting a time interval and source port from the USR.

At step 530, location center 110 may adjust its operation by opening a SCTP transport connection with the indicated input/destination port of firewall apparatus 140, e.g., with an indicated IPV6 address, and make the receiver ready for reception. Location center 110 may then transmit, during the time interval, the update concerning at least one wireless device 150 at step 540 and the processing of the SUR may be done at step 550.

Figure 6:
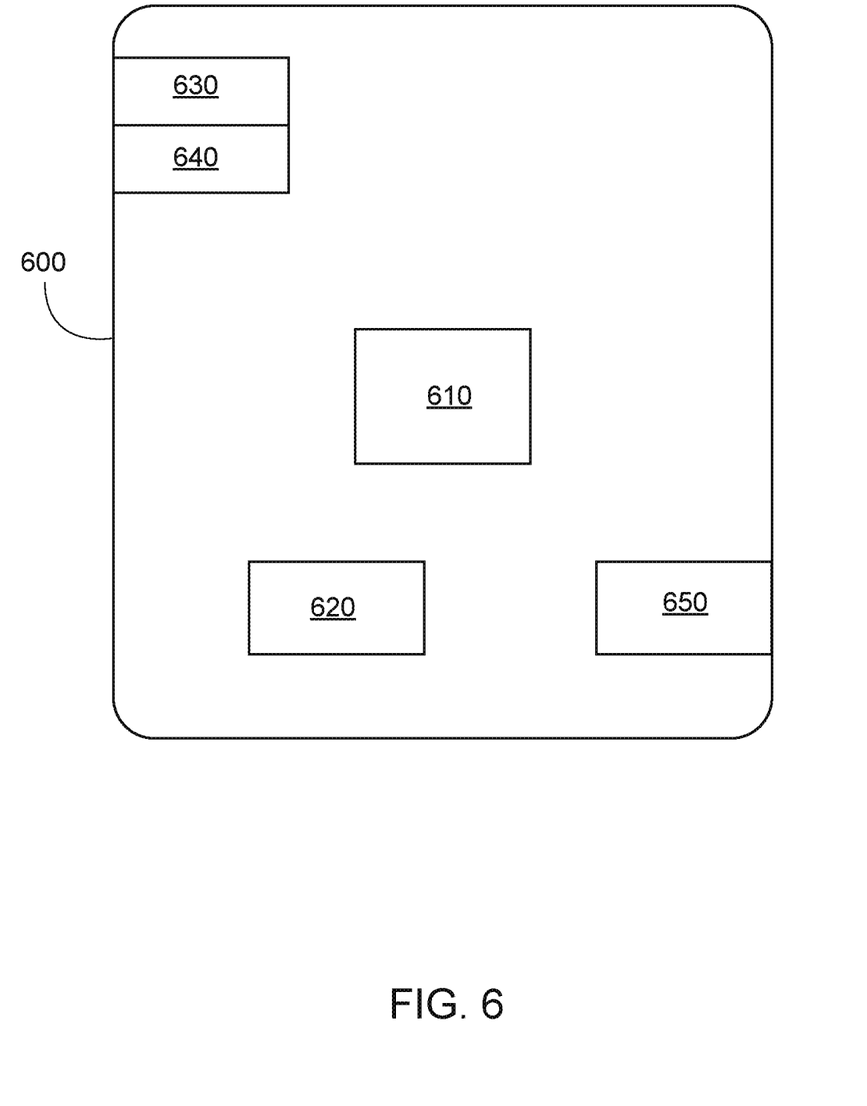
FIG. 6 illustrates an example apparatus capable of supporting at least some example embodiments.

FIG. 6 illustrates an example apparatus capable of supporting at least some example embodiments. Illustrated is device 600, which may comprise, for example, SSP 135 or firewall apparatus 140, or a device controlling functioning thereof. Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. Processor 610 may comprise at least one Application-Specific Integrated Circuit, ASIC. Processor 610 may comprise at least one Field-Programmable Gate Array, FPGA. Processor 610 may comprise an Intel Xeon processor for example. Processor 610 may be means for performing method steps in device 600, such as determining, causing transmitting and causing receiving. Processor 610 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part comprised in processor 610. Memory 620 may be at least in part external to device 600 but accessible to device 600.

Device 600 may comprise a transmitter 630. Device 600 may comprise a receiver 640. Transmitter 630 and receiver 640 may be configured to transmit and receive, respectively, information in accordance with at least one cellular standard, such as a standard defined by the 3GPP. Transmitter 630 may comprise more than one transmitter. Receiver 640 may comprise more than one receiver. Transmitter 630 and/or receiver 640 may be configured to operate in accordance with a suitable communication standard.

Device 600 may comprise User Interface, UI, 650. UI 650 may comprise at least one of a display, a keyboard, a touchscreen, a vibrator arranged to signal to a user by causing device 600 to vibrate, a speaker and a microphone. A user may be able to operate device 600 via UI 650, for example to configure device 600 and/or functions it runs.

Processor 610 may be furnished with a transmitter arranged to output information from processor 610, via electrical leads internal to device 600, to other devices comprised in device 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to device 600, from other devices comprised in device 600. Such a receiver may comprise a serial bus receiver arranged to, for example, receive information via at least one electrical lead from receiver 640 for processing in processor 610. Alternatively to a serial bus, the receiver may comprise a parallel bus receiver.

Device 600 may comprise further devices not illustrated in FIG. 6. In some example embodiments, device 600 lacks at least one device described above. For example, device 600 may not have UI 650.

Processor 610, memory 620, transmitter 630, receiver 640 and/or UI 650 may be interconnected by electrical leads internal to device 600 in a multitude of different ways. For example, each of the aforementioned devices may be separately connected to a master bus internal to device 600, to allow for the devices to exchange information. However, as the skilled person will appreciate, this is only one example and depending on the embodiment various ways of interconnecting at least two of the aforementioned devices may be selected without departing from the scope of the present invention.

Figure 7:
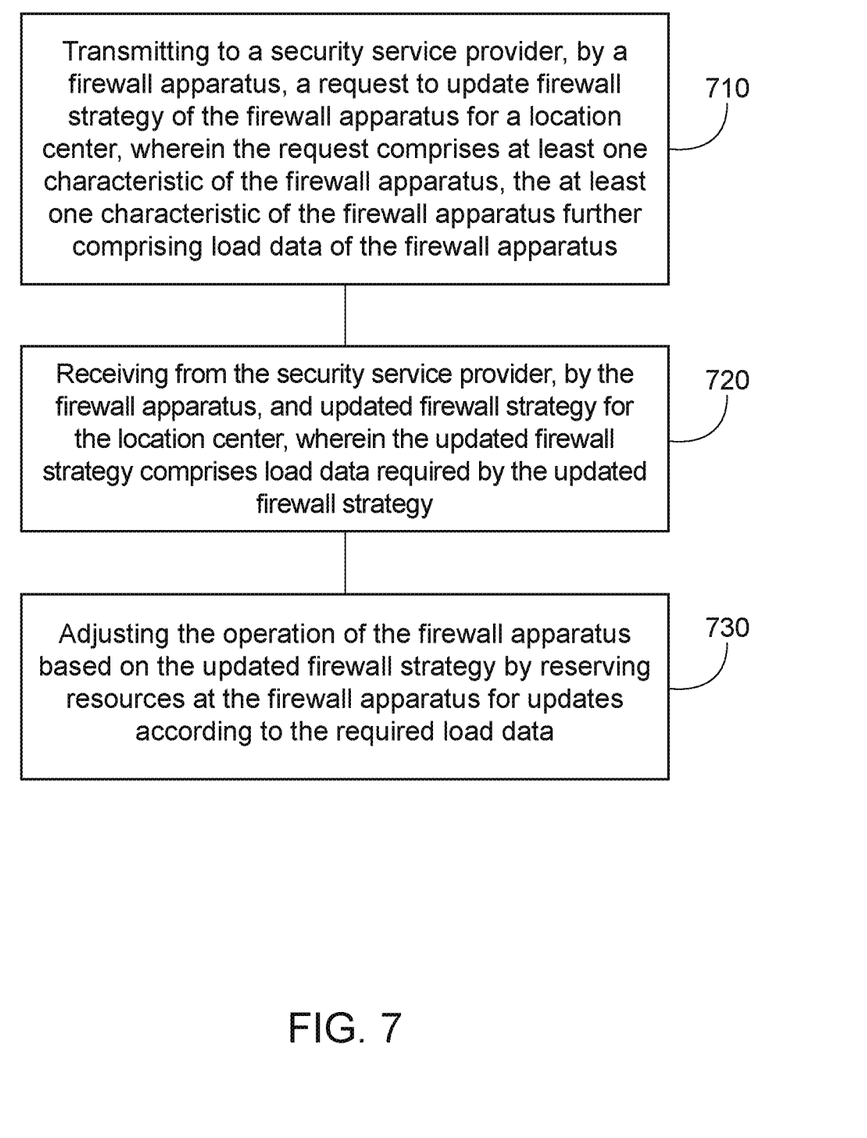
FIG. 7 illustrates a flow graph of a first method in accordance with at least some example embodiments.

FIG. 7 is a flow graph of a first method in accordance with at least some example embodiments. The phases of the illustrated first method may be performed by firewall apparatus 140, or by a control device configured to control the functioning thereof, possibly when installed therein.

The first method may comprise, at step 710, transmitting to a security service provider, by a firewall apparatus, a request to update firewall strategy of the firewall apparatus for a location center, wherein the request comprises at least one characteristic of the firewall apparatus, the at least one characteristic of the firewall apparatus further comprising load data of the firewall apparatus. The first method may also comprise, at step 720, receiving from the security service provider, by the firewall apparatus, an updated firewall strategy for the location center, wherein the updated firewall strategy comprises load data required by the updated firewall strategy. Finally, the first method may comprise, at step 730, adjusting the operation of the firewall apparatus based on the updated firewall strategy by reserving resources at the firewall apparatus for updates according to the required load data.

Figure 8:
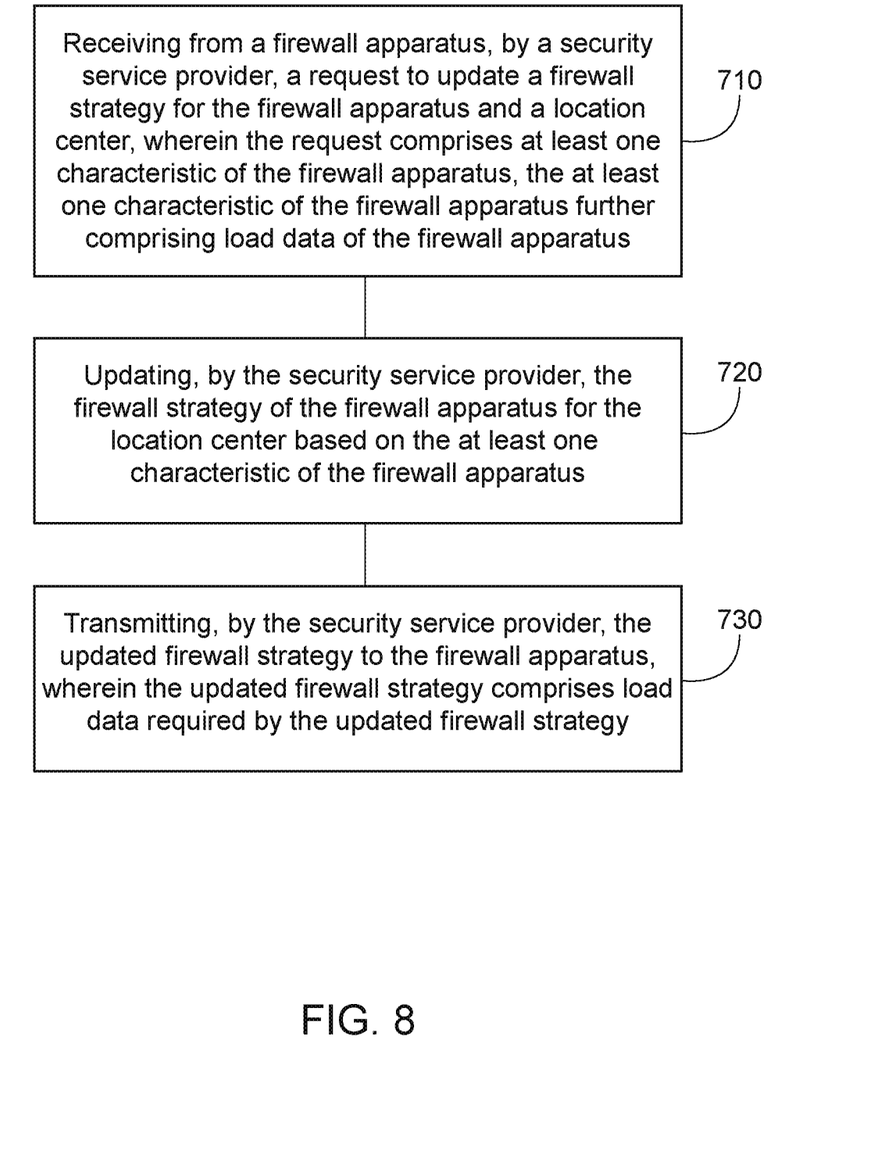
FIG. 8 illustrates a flow graph of a second method in accordance with at least some example embodiments.

FIG. 8 is a flow graph of a second method in accordance with at least some example embodiments. The phases of the illustrated second method may be performed by SSP 135, or by a control device configured to control the functioning thereof, possibly when installed therein.

The second method may comprise, at step 810, receiving from a firewall apparatus, by a security service provider, a request to update a firewall strategy for the firewall apparatus and a location center, wherein the request comprises at least one characteristic of the firewall apparatus, the at least one characteristic of the firewall apparatus further comprising load data of the firewall apparatus. The second method may also comprise, at step 820, updating, by the security service provider, the firewall strategy of the firewall apparatus for the location center based on the at least one characteristic of the firewall apparatus. Finally, the second method may comprise, at step 830, transmitting, by the security service provider, the updated firewall strategy to the firewall apparatus, wherein the updated firewall strategy comprises load data required by the updated firewall strategy.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, SSP 135 or firewall apparatus 140, or a device controlling functioning thereof, may comprise means for carrying out the example embodiments described above and any combination thereof.

In an example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an example embodiment, an apparatus, such as, for example, SSP 135 or firewall apparatus 140, or a device controlling functioning thereof, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application at least in 5G networks, wherein it is desirable to enhance security of updates, and possibly in other wireless communication networks in the future as well.

Acronyms List

3GPP 3rd Generation Partnership Project
AMF Access and Mobility Function
AUSF Authentication Server Function CPU Central Processing Unit
DCA Device Characteristics Acknowledgement
DCR Device Characteristics Request
HSS Home Subscriber Server
IoT Internet of Things
LTE Long Term Evolution
M2M Machine-to-Machine
MME Mobility Management Entity
MTC Machine Type Communications
NEF Network Exposure Function
NR New Radio
NSSF Network Slice Selection Function
NWDAF Network Data Analysis Function
OAM Operations Administration and Maintenance
RAN Radio Access Network
RAT Radio Access Technology
SBA Service Based Architecture
SMF Session Management Function
SOFS Strategy Oriented Firewall Service
SSP Security Service Provider
SUA Strategy Update Acknowledgement
SUR Strategy Update Request
UDSF Unstructured Data Storage Function
UDM Unified Data Management
UDR User Data Repository
USA Update Schedule Acknowledgement
USR Update Schedule Request

| REFERENCE SIGNS LIST | |
| --- | --- |
| 100 | Mobile network |
| 110 | Location center |
| 120 | RAN |
| 125 | Core network function |
| 130 | Malicious apparatus |
| 135 | SSP |
| 140 | Firewall apparatus |
| 210-255 | Steps of the process of FIG. 2 |
| 310-360 | Steps of the process of FIG. 3 |
| 410-450 | Steps of the workflow of FIG. 4 |
| 510- 550 | Steps of the workflow of FIG. 5 |
| 600-650 | Structure of the apparatus of FIG. 6 |
| 710-730 | Phases of the first method in FIG. 7 |
| 810-830 | Phases of the first method in FIG. 8 |

The invention claimed is:

1. A method, comprising:
transmitting to a security service provider, by a firewall apparatus, a request to update firewall strategy of the firewall apparatus for a location center, wherein the request comprises at least one characteristic of the firewall apparatus, the at least one characteristic of the firewall apparatus further comprising load data of the firewall apparatus;
receiving from the security service provider, by the firewall apparatus, an updated firewall strategy for the location center, wherein the updated firewall strategy comprises: load data required by the updated firewall strategy, and a rule-based knowledge set for making a prediction model at the firewall apparatus; and
adjusting an operation of the firewall apparatus based on the updated firewall strategy by reserving resources at the firewall apparatus for updates according to the required load data.

2. A method according to claim 1, further comprising:
receiving an update concerning at least one Internet of Things, IOT, device;
determining whether the update is from the location center based on the updated firewall strategy; and
deciding whether to forward the update to the at least one IoT device depending on said determination.

3. A method according to claim 2, further comprising:
forwarding the update to the at least one IoT device upon determining that the update is from the location center.

4. A method according to claim 2, further comprising:
dropping the update concerning the at least one IoT device upon determining that the update is not from the location center.

5. A method according to claim 1, wherein the at least one characteristic of the firewall apparatus comprises an indication about at least one of a number of processes running at the firewall apparatus, number of threads in a process running at the firewall apparatus, mode of device operations of the firewall apparatus, at least one transport protocol supported by the firewall apparatus, at least one application layer protocol supported by the firewall apparatus, at least one Internet Protocol, IP, version supported by the firewall apparatus, response timers of the firewall apparatus, a number of connections at the firewall apparatus and a mode of connection of the firewall apparatus.

6. A method according to claim 1, wherein the updated firewall strategy comprises a time interval.

7. A method according to claim 6, further comprising:
determining that an update concerning at least one IoT device is valid when the update is received during the time interval.

8. A method according to claim 1, wherein the updated firewall strategy comprises an indication about at least one of an input port of the firewall apparatus and a source port of the location center.

9. A method according to claim 8, further comprising:
determining that an update concerning at least one IoT device is valid when the update is received at the input port.

10. A method according to claim 9, further comprising:
determining that the update is valid when the update is received from the source port.

11. A method, comprising:
receiving from a firewall apparatus, by a security service provider, a request to update a firewall strategy for the firewall apparatus and a location center, wherein the request comprises at least one characteristic of the firewall apparatus, the at least one characteristic of the firewall apparatus further comprising load data of the firewall apparatus;
updating, by the security service provider, the firewall strategy of the firewall apparatus for the location center based on the at least one characteristic of the firewall apparatus; and
transmitting, by the security service provider, the updated firewall strategy to the firewall apparatus, wherein the updated firewall strategy comprises; load data required by the updated firewall strategy, and a rule-based knowledge set for making a prediction model at the firewall apparatus.

12. A method according to claim 11, wherein the at least one characteristic of the firewall apparatus comprises an indication about at least one of a number of processes running at the firewall apparatus, number of threads in a process running at the firewall apparatus, mode of device operations of the firewall apparatus, at least one transport protocol supported by the firewall apparatus, at least one application layer protocol supported by the firewall apparatus, at least one Internet Protocol, IP, version supported by the firewall apparatus, a response timer of the firewall apparatus, a number of connections at the firewall apparatus and a mode of connection of the firewall apparatus.

13. A method according to claim 11, wherein the updated firewall strategy comprises a time interval.

14. A method according to claim 11, wherein the updated firewall strategy comprises an indication about an input port of the firewall apparatus.

15. A method according to claim 11, wherein the updated firewall strategy comprises an indication about a source port of the location center.

16. A method according to claim 11, further comprising:
    transmitting the updated firewall strategy to the location center.

17. An apparatus comprising at least one processing core, at least one memory including computer program code, the at least one memory and the computer program code being configured to, with the at least one processing core, cause the apparatus at least to perform:

transmit to a security service provider, by a firewall apparatus, a request to update firewall strategy of the firewall apparatus for a location center, wherein the request comprises at least one characteristic of the firewall apparatus, the at least one characteristic of the firewall apparatus further comprising load data of the firewall apparatus;

receive from the security service provider, by the firewall apparatus, an updated firewall strategy for the location center, wherein the updated firewall strategy comprises: load data required by the updated firewall strategy, and a rule-based knowledge set for making a prediction model at the firewall apparatus; and adjust an operation of the firewall apparatus based on the updated firewall strategy by reserving resources at the firewall apparatus for updates according to the required load data.

* * * * *